(12) United States Patent
Xiao et al.

(10) Patent No.: US 9,015,487 B2
(45) Date of Patent: Apr. 21, 2015

(54) APPARATUS AND METHOD FOR VIRTUAL PAIRING USING AN EXISTING WIRELESS CONNECTION KEY

(75) Inventors: Lu Xiao, San Diego, CA (US); Gregory Gordon Rose, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1123 days.

(21) Appl. No.: 12/415,911

(22) Filed: Mar. 31, 2009

(65) Prior Publication Data

US 2010/0246824 A1    Sep. 30, 2010

(51) Int. Cl.
*H04L 29/06* (2006.01)
*H04W 12/04* (2009.01)
*H04L 9/08* (2006.01)

(52) U.S. Cl.
CPC ............ *H04L 63/061* (2013.01); *H04L 9/0861* (2013.01); *H04L 9/0827* (2013.01); *H04L 63/162* (2013.01); *H04L 2463/061* (2013.01);
(Continued)

(58) Field of Classification Search
CPC ... H04W 12/00; H04L 63/04; H04L 63/0428; H04L 63/061; H04L 63/0884; H04L 63/18; H04L 9/0827; H04L 9/3215; H04L 9/0816; H04L 9/0838; H04L 9/0841; H04L 9/0861; H04L 9/0869
USPC ............. 713/171, 150, 157, 168; 380/44, 47, 380/255, 259–260, 262, 270, 33–34, 274, 380/277–278, 283; 709/277–228
See application file for complete search history.

(56) References Cited

U.S. PATENT DOCUMENTS

| | | | |
|---|---|---|---|
| 6,584,567 B1 * | 6/2003 | Bellwood et al. | 713/171 |
| 7,093,121 B2 * | 8/2006 | Barton et al. | 713/150 |
| 7,249,377 B1 * | 7/2007 | Lita et al. | 726/12 |

(Continued)

FOREIGN PATENT DOCUMENTS

| | | |
|---|---|---|
| EP | 1280296 A1 | 1/2003 |
| EP | 1280296 B1 | 12/2004 |

(Continued)

OTHER PUBLICATIONS

International Search Report and Written Opinion—PCT/US2010/029362, International Search Authority—European Patent Office—Jul. 15, 2010.

(Continued)

*Primary Examiner* — Saleh Najjar
*Assistant Examiner* — Eric W Shepperd
(74) *Attorney, Agent, or Firm* — Won Tae Kim

(57) ABSTRACT

Disclosed is a method for virtual pairing of a first peer device with a second peer device. In the method, a nonce is generated at the first peer device for use in virtually pairing the first and second peer devices to establish a first-type wireless connection. The nonce is forwarded from the first peer device to the second peer device over an already established second-type wireless connection between the first and second peer devices. At least one new key is generated from the nonce and a shared key for the already established second-type wireless connection. The first peer device is virtually paired with the second peer device using the at least one new key to establish the first-type wireless connection between the first and second peer devices.

22 Claims, 3 Drawing Sheets

(52) U.S. Cl.
CPC .............. *H04W 12/04* (2013.01); *H04L 9/0841* (2013.01); *H04L 2209/80* (2013.01)

(56) References Cited

U.S. PATENT DOCUMENTS

| | | | |
|---|---|---|---|
| 7,644,275 B2* | 1/2010 | Mowers et al. | 713/168 |
| 7,761,710 B2* | 7/2010 | Lillie et al. | 713/171 |
| 7,783,041 B2* | 8/2010 | Asokan et al. | 380/255 |
| 7,792,065 B2* | 9/2010 | Jepson et al. | 370/261 |
| 8,078,873 B2* | 12/2011 | Shah et al. | 713/169 |
| 8,613,071 B2* | 12/2013 | Day et al. | 726/12 |
| 2003/0023879 A1* | 1/2003 | Wray | 713/201 |
| 2004/0003250 A1* | 1/2004 | Kindberg et al. | 713/171 |
| 2004/0128509 A1* | 7/2004 | Gehrmann | 713/171 |
| 2005/0141706 A1* | 6/2005 | Regli et al. | 380/44 |
| 2005/0193203 A1 | 9/2005 | Freeman et al. | |
| 2005/0251680 A1* | 11/2005 | Brown et al. | 713/171 |
| 2005/0266798 A1* | 12/2005 | Moloney et al. | 455/41.2 |
| 2005/0273609 A1* | 12/2005 | Eronen | 713/171 |
| 2006/0221917 A1 | 10/2006 | McRae | |
| 2007/0079113 A1* | 4/2007 | Kulkarni et al. | 713/150 |
| 2008/0049694 A1* | 2/2008 | Kinoshita et al. | 370/338 |
| 2008/0089519 A1* | 4/2008 | Ekberg | 380/270 |
| 2008/0175379 A1* | 7/2008 | Hansen et al. | 380/44 |
| 2009/0034498 A1* | 2/2009 | Banerjea et al. | 370/338 |
| 2009/0067846 A1* | 3/2009 | Yu et al. | 398/128 |
| 2009/0222659 A1* | 9/2009 | Miyabayashi et al. | 713/156 |
| 2009/0249478 A1* | 10/2009 | Rosener et al. | 726/19 |
| 2009/0313472 A1* | 12/2009 | Guccione et al. | 713/171 |
| 2010/0208705 A1 | 8/2010 | Yokota | |

FOREIGN PATENT DOCUMENTS

| | | |
|---|---|---|
| JP | 2004289373 A | 10/2004 |
| JP | 2005244988 A | 9/2005 |
| JP | 2007053612 A | 3/2007 |
| JP | 2009010766 A | 1/2009 |
| JP | 2009218845 A | 9/2009 |
| JP | 2011501554 A | 1/2011 |
| WO | WO2008124796 | 10/2008 |
| WO | WO-2009051400 A2 | 4/2009 |

OTHER PUBLICATIONS

The Bluetooth Forum: "Bluetooth Specification v1.1, Bluetooth Security" Internet Citation Feb. 22, 2001, XP002171382 Retrieved from the Internet: URL:http://www.bluetooth.com/developer/specification/specification.asp, section 14.2, figures 14.2, 14.3.

Andrew R. Rolfe, "Out-of-Band Authentication Protects Online Financial Data", E-Commerce Times, Feb. 6, 2007, http://www.ecommercetimes.com/story/55570.html.

Taiwan Search Report—TW099109957—TIPO—Mar. 13, 2013.

* cited by examiner

APPARATUS AND METHOD FOR VIRTUAL PAIRING USING AN EXISTING WIRELESS CONNECTION KEY

BACKGROUND

1. Field

The present invention relates generally to establishing a secure wireless connection with a peer device.

2. Background

Peer-to-peer networks that wirelessly transfer data over short distances are becoming prevalent due to advantages over traditional wired connections that use cables. BLUETOOTH and ZIGBEE are examples of standards for short range peer networks. However, wireless communications between peer devices generally requires user involvement to pair the peer devices.

There is therefore a need for a technique for establishing wireless connections with a peer device without requiring repeated user involvement.

SUMMARY

An aspect of the present invention may reside in a method for virtual pairing of a first peer device with a second peer device. In the method, a nonce is generated at the first peer device for use in virtually pairing the first and second peer devices to establish a first-type wireless connection. The nonce is forwarded from the first peer device to the second peer device over an already established second-type wireless connection between the first and second peer devices. At least one new key is generated from the nonce and a shared key for the already established second-type wireless connection. The first peer device is virtually paired with the second peer device using the at least one new key to establish the first-type wireless connection between the first and second peer devices.

In more detailed aspects of the invention, the first-type wireless connection may be a high-speed connection, and the second-type wireless connection may be a low-power connection. The first-type wireless connection may be a Wi-Fi connection, and the second-type wireless connection may be a BLUETOOTH (BT) connection. The new key for establishing the Wi-Fi connection may be formed in accordance with the following equation: Wi-Fi key=kdf(BT link key||nonce), where BT link key is the shared key for the already established BLUETOOTH connection, and where kdf is a key derivation function. Alternatively, the first-type connection may be a BLUETOOTH connection, and the second-type wireless connection may be a Wi-Fi connection.

In other more detailed aspects of the invention, the virtually pairing to establish the first-type wireless connection may be performed when the second-type wireless connection is experiencing interference exceeding a predetermined threshold. Further, the first-type wireless connection may have first-type transmission characteristics, the second-type wireless connection may have second-type transmission characteristics, and the virtually pairing to establish the first-type wireless connection may be performed when the first-type transmission characteristics are more favorable than the second-type transmission characteristics. Also, the first-type wireless connection may be a secure connection, and the second-type wireless connection may be a secure connection.

Another aspect of the invention may reside in an apparatus for virtual pairing with a peer device. The apparatus may include means for generating a nonce for use in virtually pairing the apparatus with the peer device to establish a first-type wireless connection, means for forwarding the nonce to the peer device over an already established second-type wireless connection between the apparatus and the peer device, means for generating at least one new key from the nonce and a shared key for the already established second-type wireless connection, and means for virtually pairing the apparatus with the peer device using the at least one new key to establish the first-type wireless connection between the apparatus and the peer device. The apparatus may comprise a watch, a headset, or a sensing device.

Another aspect of the invention may reside in a computer program product, comprising computer-readable medium, comprising code for causing a computer to generate a nonce for use in virtually pairing with a peer device to establish a first-type wireless connection, code for causing a computer to forward the nonce to the peer device over an already established second-type wireless connection with the peer device, code for causing a computer to generate at least one new key from the nonce and a shared key for the already established second-type wireless connection, and code for causing a computer to virtually pair with the peer device using the at least one new key to establish the first-type wireless connection with peer device.

Another aspect of the invention may reside in an apparatus, for virtual pairing with a peer device, comprising a processor and a memory device coupled to the processor for storing data. The processor is configured to generate a nonce for use in virtually pairing the apparatus with the peer device to establish a first-type wireless connection, forward the nonce to the peer device over an already established second-type wireless connection between the apparatus and the peer device, generate at least one new key from the nonce and a shared key for the already established second-type wireless connection, and virtually pair the apparatus with the peer device using the at least one new key to establish the first-type wireless connection between the apparatus and the peer device.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
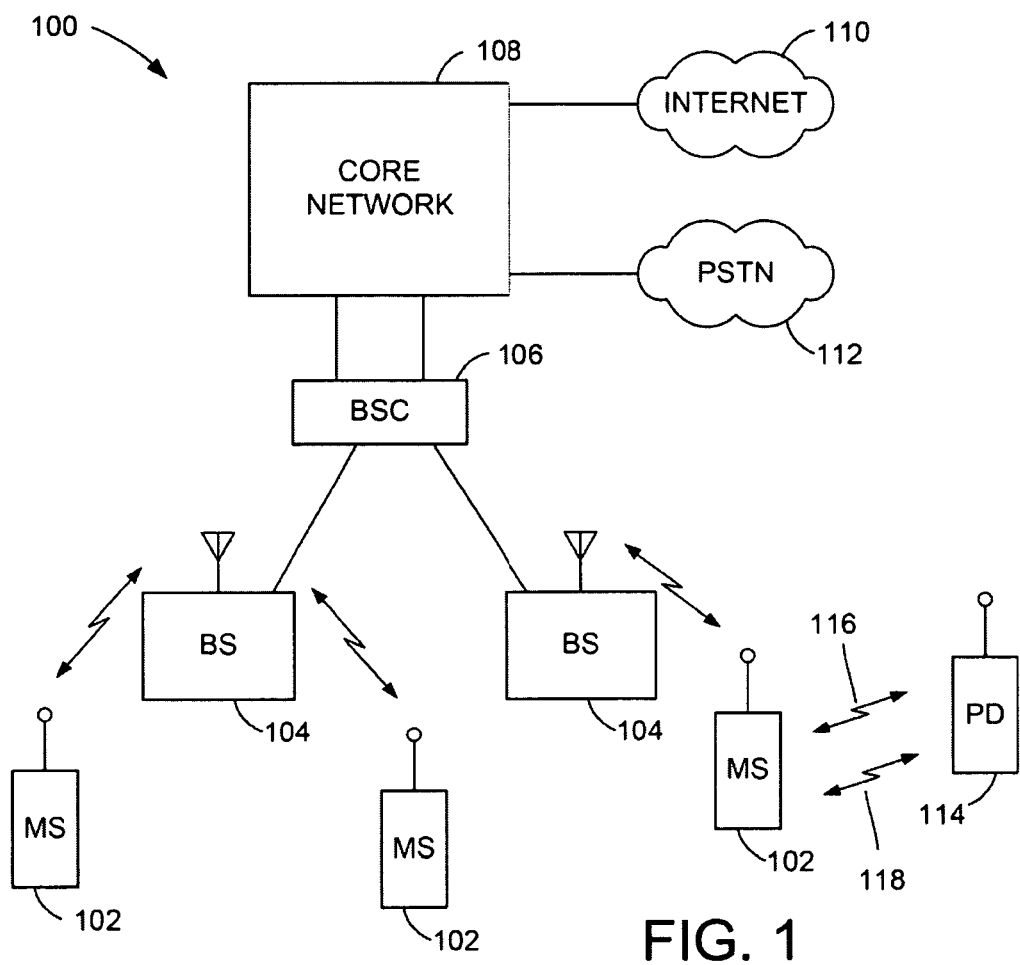
FIG. 1 is a block diagram of an example of a wireless communication system.
Figure 2:
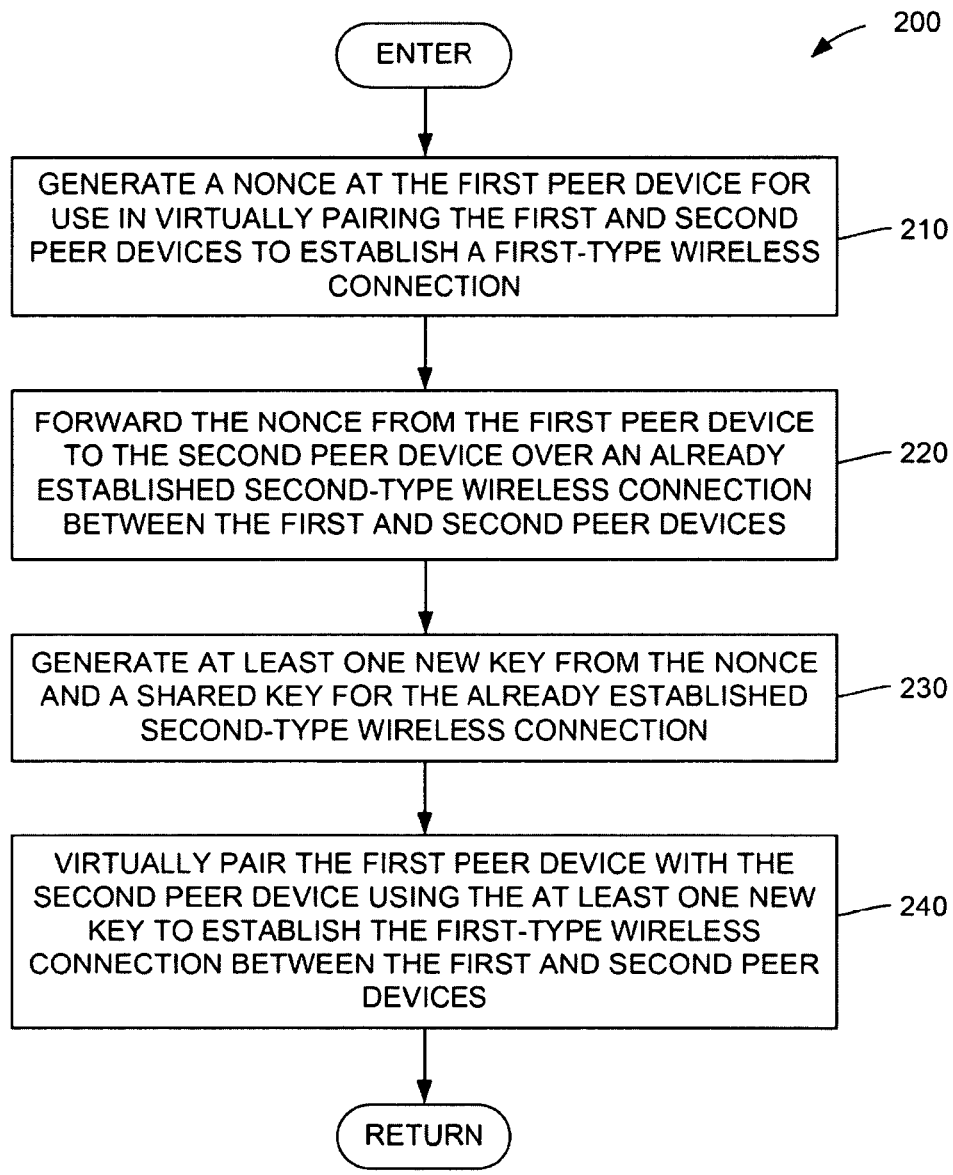
FIG. 2 is a flow diagram of a method for virtually pairing a first peer device with a second peer device.

With reference to FIGS. 1 and 2, an aspect of die present invention may reside in a method 200 for virtual pairing of a first peer device, such as a mobile station 102, with a second peer device (PD) 114. In the method, a nonce is generated at the first peer device for use in virtually pairing the first and second peer devices to establish a first-type wireless connection 116 (step 210). The nonce is forwarded from the first peer device to the second peer device over an already established second-type wireless connection 118 between the first and second peer devices (step 220). At least one new key is generated from the nonce and a shared key for the already established second-type wireless connection (step 230). The first peer device is virtually paired with the second peer device using the at least one new key to establish the first-type wireless connection between the first and second peer devices (step 240).

The first-type wireless connection 116 may be a high-speed connection, and the second-type wireless connection 118 may be a low-power connection. The first-type wireless connection may be a Wi-Fi connection, and the second-type wireless connection may be a BLUETOOTH connection. The new key for establishing the Wi-Fi connection may be formed in accordance with the following equation:

$$\text{Wi-Fi key}=\text{kdf}(\text{BT link key}\|\text{nonce}), \qquad (\text{Eqn. 1})$$

where BT link key is the shared key for the already established BLUETOOTH connection, and where kdf( ) is a key derivation function. A typical kdf( ) may be located in ANSI-X9.63, "Public Key Cryptography for the Financial Services Industry, Key Agreement and Key Transport Using Elliptic Curve Cryptography". An additional nonce may be included in the formation of the new key. For example, the second peer device may generate a second nonce in addition to the first nonce generated by the first peer device. Thus, the new key may be formed in accordance with the following equation:

$$\text{Wi-Fi key}=\text{kdf}(\text{BT link key}\|\text{nonce1}\|\text{nonce2}), \qquad (\text{Eqn. 2})$$

Also, reversing the situation, the first-type connection may be a BLUETOOTH connection, and the second-type wireless connection may be a Wi-Fi connection.

The virtual pairing to establish the first-type wireless connection 116 may be performed when the second-type wireless connection 118 is experiencing interference exceeding a predetermined threshold. Further, the first-type wireless connection may have first-type transmission characteristics, the second-type wireless connection may have second-type transmission characteristics, and the virtually pairing to establish the first-type wireless connection may be performed when the first-type transmission characteristics are more favorable than the second-type transmission characteristics. Also, the first-type wireless connection may be a secure connection, and the second-type wireless connection may be a secure connection.

The new key establishment of the present invention relies on existing device authentication. Device authentication is a process to enable one device to distinguish itself from possible imposters. Device authentication is very important for wireless, peer-to-peer connections, which are vulnerable to eavesdropping and masquerading. There are various approaches for device authentication: pass code verification, restriction of distance, event synchronization, etc. Most of these approaches require human involvement. Security delegation for device authentication means that once authenticated with one connection technique, a device is regarded to be trustable. As a result, it is not necessary to perform authentication specified by another connection technique.

Figure 3:
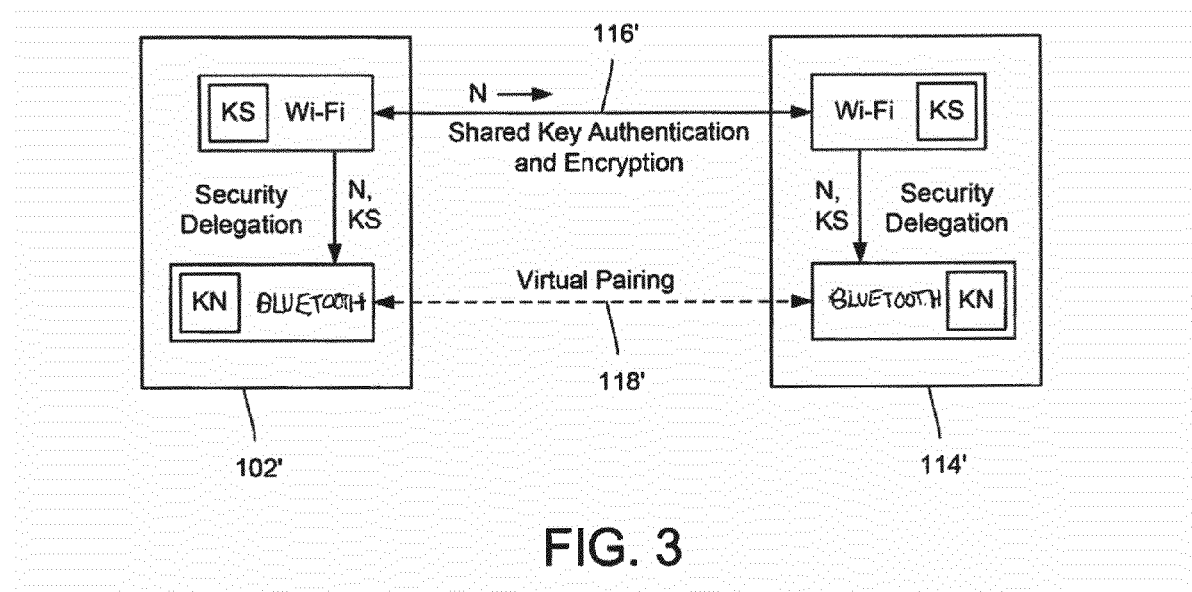
FIG. 3 is a block diagram of a security delegation in first and second peer devices to generate a new key to virtually pair the devices to establish another wireless connection.

An example of simplified device authentication of a new wireless connection 118', e.g., a Bluetooth connection, using and existing wireless connection 116', e.g., a Wi-Fi connection, is shown with reference to FIG. 3. A first peer device 102', e.g., a laptop computer, and a second peer device 114', e.g., a smart phone, may be interconnected in Wi-Fi ad hoc mode with wired equivalent privacy (WEP) or Wi-Fi protected access (WPA) enabled. The two peer devices have been authenticated, e.g., through shared key (KS) authentication for the existing wireless connection 116'. The owner(s) of these two devices may also want them to be paired through Bluetooth in order to sync phonebook and ring tones. In this case, the whole Bluetooth pairing process can be removed. Instead, a virtual Bluetooth pairing process can be initiated automatically without user involvement. The Bluetooth key material, e.g., a nonce N, may be generated randomly and then transported through a secured Wi-Fi link.

Many wireless connection techniques establish cipher keys by entering the same pass code on both sides of a link. When a block cipher such as AES-128 is used, it is not easy for a user to type 32 hexadecimal digits for creating a strong key. Some techniques use Diffie-Hellman or elliptic curve Diffie-Hellman to exchange cipher keys, which saves user inputs but costs time-consuming computation. However, these key exchange algorithms neither perform authentication nor establish initial trust.

Security delegation may be used to derive the new shared secret key (KN) from the shared key, KS, established by another connection technique. As a result, no further user involvement or time consuming operations are necessary. As another example using Wi-Fi and Bluetooth, the two peer devices may have been paired through Bluetooth. When these two devices want to set up a peer-to-peer Wi-Fi link for high speed file transfer, the Bluetooth link key can be used to derive keys used for WEP or WPA.

Figure 4:
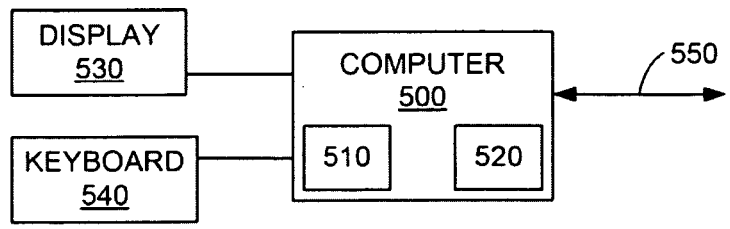
FIG. 4 is a block diagram of a computer including a processor and a memory.

With reference to FIG. 4, another aspect of the invention may reside in an apparatus 500 for virtual pairing with a peer device 114. The apparatus may include means (processor 510) for generating a nonce for use in virtually pairing the apparatus with the peer device to establish a first-type wireless connection, means for forwarding the nonce to the peer device over an already established second-type wireless connection between the apparatus and the peer device, means for generating at least one new key from the nonce and a shared key for the already established second-type wireless connection, and means for virtually pairing the apparatus with the peer device using the at least one new key to establish the first-type wireless connection between the apparatus and the peer device. The apparatus may comprise a watch, a headset, a sensing device, or a mobile station 102.

The apparatus may further include a storage medium 520 such as memory, a display 530, and an input device 540 such as a keyboard. The apparatus may include a wireless connection 550.

Another aspect of the invention may reside in a computer program product, comprising computer-readable medium 520, comprising code for causing a computer 500 to generate a nonce for use in virtually pairing with a peer device to establish a first-type wireless connection, code for causing a computer to forward the nonce to the peer device over an already established second-type wireless connection with the peer device, code for causing a computer to generate at least one new key from the nonce and a shared key for the already established second-type wireless connection, and code for causing a computer to virtually pair with the peer device using the at least one new key to establish the first-type wireless connection with peer device.

Another aspect of the invention may reside in an apparatus 500, for virtual pairing with a peer device, comprising a processor 510 and a memory device 520 coupled to the processor for storing data. The processor is configured to generate a nonce for use in virtually pairing the apparatus with the peer device to establish a first-type wireless connection, forward the nonce to the peer device over an already established second-type wireless connection between the apparatus and the peer device, generate at least one new key from the notice and a shared key for the already established second-type wireless connection, and virtually pair the apparatus with the peer device using the at least one new key to establish the first-type wireless connection between the apparatus and the peer device.

With reference again to FIG. 1, a wireless mobile station (MS) 102 may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device, 102 or 114, may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, orthogonal frequency division multiplexing (OFDM), orthogonal frequency division multiple access (OFDMA), WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user 110 device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for virtual pairing of a first peer device with a second peer device, comprising:
   generating a nonce at the first peer device for use in virtually pairing the first and second peer devices to establish a first-type wireless connection having a first-type protocol;
   forwarding the nonce from the first peer device to the second peer device over an existing second-type wireless connection between the first and second peer devices;
   generating at least one new link key for the first-type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   virtually pairing the first peer device with the second peer device using the at least one new link key to establish the first-type wireless connection between the first and second peer devices.

2. A method for virtual pairing as defined in claim 1, wherein the first-type wireless connection is a high-speed connection, and the second-type wireless connection is a low-power connection.

3. A method for virtual pairing as defined in claim 1, wherein the first-type wireless connection and the second-type wireless connection correspond to different ones of a wireless body area network, a wireless local area network, a wireless personal area network, or a wireless wide area network.

4. A method for virtual pairing as defined in claim 1, wherein the new link key for establishing the first-type wireless connection is formed in accordance with the following equation: new first-type wireless connection link key=kdf (second-type wireless connection shared link key∥nonce), where kdf is a key derivation function.

5. A method for virtual pairing as defined in claim 1, wherein the first-type wireless connection is a secure connection, and the second-type wireless connection is a secure connection.

6. A method for virtual pairing as defined in claim 1, wherein the virtually pairing to establish the first-type wireless connection is performed when the second-type wireless connection is experiencing interference exceeding a predetermined threshold.

7. Apparatus for virtual pairing with a peer device, comprising:
   means for generating a nonce for use in virtually pairing the apparatus with the peer device to establish a first-type wireless connection having a first-type protocol;
   means for forwarding the nonce to the peer device over an existing second-type wireless connection between the apparatus and the peer device;
   means for generating at least one new link key for the first-type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   means for virtually pairing the apparatus with the peer device using the at least one new link key to establish the first-type wireless connection between the apparatus and the peer device.

8. Apparatus for virtual pairing as defined in claim 7, wherein the first-type wireless connection is a high-speed connection, and the second-type wireless connection is a low-power connection.

9. Apparatus for virtual pairing as defined in claim 7, wherein the first-type wireless connection and the second-type wireless connection correspond to two of a wireless body area network, a wireless local area network, a wireless personal area network, or a wireless wide area network.

10. Apparatus for virtual pairing as defined in claim 9, wherein the new link key for establishing the first-type wireless connection is formed in accordance with the following equation: new first-type wireless connection key=kdf(second-type wireless connection shared link key∥nonce), where kdf is a key derivation function.

11. Apparatus for virtual pairing as defined in claim 7, wherein the first-type wireless connection is a secure connection, and the second-type wireless connection is a secure connection.

12. Apparatus for virtual pairing as defined in claim 7, wherein the virtually pairing to establish the first-type wireless connection is performed when the second-type wireless connection is experiencing interference exceeding a predetermined threshold.

13. A computer program product, comprising: a non-transitory computer readable medium, comprising:
   code for causing a computer to generate a nonce for use in virtually pairing with a peer device to establish a first-type wireless connection having a first-type protocol;
   code for causing a computer to forward the nonce to the peer device over an existing second-type wireless connection with the peer device;
   code for causing a computer to generate at least one new link key for the first-type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   code for causing a computer to virtually pair with the peer device using the at least one new link key to establish the first-type wireless connection with peer device.

14. A computer program product as defined in claim 13, wherein the first-type wireless connection is a high-speed connection, and the second-type wireless connection is a low-power connection.

15. A computer program product as defined in claim 13, wherein the first-type wireless connection, and the second-type wireless connection correspond to different ones of a wireless body area network, a wireless local area network, a wireless personal area network, or a wireless wide area network.

16. A computer program product as defined in claim 13, wherein the new link key for establishing the first-type wireless connection is formed in accordance with the following equation: new first-type wireless connection link key=kdf (second-type wireless connection shared link key||nonce), where kdf is a key derivation function.

17. A computer program product as defined in claim 13, wherein the first-type wireless connection is a secure connection, and the second-type wireless connection is a secure connection.

18. A computer program product as defined in claim 13, wherein the virtually pairing to establish the first-type wireless connection is performed when the second-type wireless connection is experiencing interference exceeding a predetermined threshold.

19. A watch, comprising:
   means for generating a nonce for use in virtually pairing the watch with a peer device to establish a first-type wireless connection having a first-type protocol;
   means for forwarding the nonce to the peer device over an existing second-type wireless connection between the watch and the peer device;
   means for generating at least one new link key for the first type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   means for virtually pairing the watch with the peer device using the at least one new link key to establish the first-type wireless connection between the watch and the peer device.

20. A headset, comprising:
   means for generating a nonce for use in virtually pairing the headset with a peer device to establish a first-type wireless connection having a first-type protocol;
   means for forwarding the nonce to the peer device over an existing second-type wireless connection between the headset and the peer device;
   means for generating at least one new link key for the first type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   means for virtually pairing the headset with the peer device using the at least one new link key to establish the first-type wireless connection between the headset and the peer device.

21. A sensing device, comprising:
   means for generating a nonce for use in virtually pairing the sensing device with a peer device to establish a first-type wireless connection having a first-type protocol;
   means for forwarding the nonce to the peer device over an existing second-type wireless connection between the sensing device and the peer device;
   means for generating at least one new link key for the first type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
   means for virtually pairing the sensing device with the peer device using the at least one new link key to establish the first-type wireless connection between the sensing device and the peer device.

22. Apparatus for virtual pairing with a peer device, comprising:
   a processor configured to:
      generate a nonce for use in virtually pairing the apparatus with the peer device to establish a first-type wireless connection having a first-type protocol;
      forward the nonce to the peer device over an existing second-type wireless connection between the apparatus and the peer device;
      generate at least one new link key for the first type wireless connection from the nonce and a shared key for the existing second-type wireless connection using security delegation wherein security delegation comprises using device authentication from the existing second-type wireless connection without exchanging generation information for the at least one new link key according to the first-type protocol of the first-type wireless connection; and
      virtually pair the apparatus with tie peer device using the at least one new link key to establish the first-type wireless connection between the apparatus and the peer device; and
   a memory coupled to the processor for storing data.

* * * * *